United States Patent [19]
Hendriks

[11] 3,718,856
[45] Feb. 27, 1973

[54] INDUCTANCE AND CAPACITANCE REACTANCE MEASURING INSTRUMENT HAVING MINIMAL INCLUSION OF STRAY REACTANCES

[75] Inventor: Jozef H. Hendriks, Wakefield, Mass.

[73] Assignee: Teradyne, Inc., Boston, Mass.

[22] Filed: Dec. 2, 1970

[21] Appl. No.: 94,308

[52] U.S. Cl. .................................324/57 R, 324/82
[51] Int. Cl. ...........................................G01r 27/00
[58] Field of Search............................324/57, 60, 82

[56] References Cited

UNITED STATES PATENTS

| | | | |
|---|---|---|---|
| 3,243,699 | 3/1966 | Kummer | 324/57 |
| 3,562,641 | 2/1971 | Fulks | 324/57 |
| 3,584,295 | 6/1971 | Bayer | 324/57 |

*Primary Examiner*—Stanley T. Krawczewicz
*Attorney*—Kenway, Jenney & Hildreth

[57] ABSTRACT

An impedance-measuring electrical circuit modulates a high frequency current alternately with the unknown impedance being measured and with a reference impedance. A detector synchronized with the alternation of the modulation detects the resultant modulated current to produce a measure of the resistive and reactive components of the unknown impedance element relative to the corresponding components of the known reference impedance element. The modulating portion of the circuit is constructed with minimal stray reactances that effect the modulated output current, but the other portions of the circuit are essentially free of this restriction.

13 Claims, 5 Drawing Figures

INVENTOR
JOZEF H. HENDRIKS
BY
Kenway, Jenney & Hildreth
ATTORNEYS

INVENTOR
JOZEF H. HENDRIKS

INDUCTANCE AND CAPACITANCE REACTANCE MEASURING INSTRUMENT HAVING MINIMAL INCLUSION OF STRAY REACTANCES

BACKGROUND

This invention relates to the measurement of electrical reactances with minimal effect from stray reactances in the measuring equipment. More particularly, the invention provides an electrical reactance-measuring instrument that provides an improved reduction in the stray reactances included in the measure. The invention further provides an electrical measuring instrument having improved capability for measuring accurately the reactance of miniature circuit elements.

Instruments for measuring reactances at radio frequencies, which typically are of the bridge form, are constructed according to one prior art technique with all the radio frequency portions having utmost compactness to minimize the length of the interconnections and otherwise minimize stray reactances. Instruments constructed in this manner generally are costly, because the measuring instrument has relatively extensive radio frequency circuits and considerable effort therefore is required to construct them all with uniformly low stray reactances.

Another prior art technique for r. f. reactance measurement with minimal error from stray reactances, which can be practiced with bridge-type circuits, requires the delivery of a known radio frequency current to the instrument terminals connected to the unknown circuit element, and the measurement of the voltage across these terminals. The circuitry for providing this operation, although seemingly simple in concept, is complex and hence also is costly.

Accordingly, it is an object of this invention to provide an improved circuit for measuring electrical reactances, particularly at radio and like high frequencies.

Another object of the invention is to provide a reactance measuring circuit having minimal dependence on stray reactances in the circuit, as distinguished from the reactance of the unknown element being measured and whatever reference reactances are purposely provided in the circuit.

A further object of the invention is to provide a reactance-measuring circuit in which only a minimal portion needs to be constructed with low reactance in order to provide an accurate measure. That is, it is an object to provide a reactance-measuring circuit in which only the stray reactances in a small part of the circuit effect the measurement.

Another object of the invention is to provide an improved instrument for measuring reactances in integrated and like miniature circuits, and in particular to provide such an instrument operating with minimal error due to stray reactances.

It is also an object of the invention to provide measuring circuits of the above character that can measure both inductive and capacitive reactances, and that can use different kinds of reference circuit elements.

A further object of the invention is to provide measuring equipment of the above character that can be constructed at a relatively low cost.

Other objects of the invention will in part be obvious and will in part appear hereinafter.

GENERAL DESCRIPTION

One measuring circuit embodying the invention and for use with an unknown capacitive circuit element has, considered in general, a modulator and a demodulator. The modulator modulates the phase and amplitude of a radio or like frequency current in alternate time periods with the admittance of the circuit element being measured and then with the known admittance of a reference circuit element. The resultant modulated current contains all the information required to identify the unknown admittance relative to the known reference admittance. The demodulator receives this current and, operating in synchronism with the alternation of the modulator, produces an output signal measuring the capacitance of the unknown circuit element relative to the reference element. Where desired, the demodulator further processes the modulated current to produce also a measure of the conductance of the unknown circuit element relative to the reference element.

With this arrangement, the demodulator can readily be constructed for accurate operation, so that essentially only stray reactances in the modulator detract from accurate measurement of the unknown circuit element. Moreover, the modulator consists of relatively few circuit components, and only certain limited stray reactances in the modulator detract from the measuring accuracy. Consequently, the modulator can be constructed at comparatively low cost with the particular stray reactances that detract from the measuring accuracy held to a minimum. As a result, the complete measuring circuit can be constructed at relatively low cost and yet provide reactance measurements with a high degree of accuracy, i.e., with minimal error due to stray reactances.

Further, the modulator portion of the measuring equipment can be constructed compactly, e.g., with densely-assembled miniature components. The miniature modulator can then be located directly at, or at least very close to, the unknown circuit element being measured, to minimize the length of the leads connecting the circuit element under test to the modulator. For example, an instrument for measuring reactances in miniature integrated circuits can incorporate the modulator portion in the probe that contacts the circuit structure being tested. The demodulator can be located at a convenient location removed from the modulator, and connected to it by cable or even by a wireless radio link.

The invention accordingly comprises the features of construction, combinations of elements, and arrangement of parts exemplified in the constructions hereinafter set forth, and the scope of the invention is indicated in the claims.

BRIEF DESCRIPTION OF DRAWINGS

For a fuller understanding of the nature and objects of the invention, reference should be had to the following detailed description taken in connection with the accompanying drawings in which.

DESCRIPTION OF ILLUSTRATED EMBODIMENTS

Figure 1:
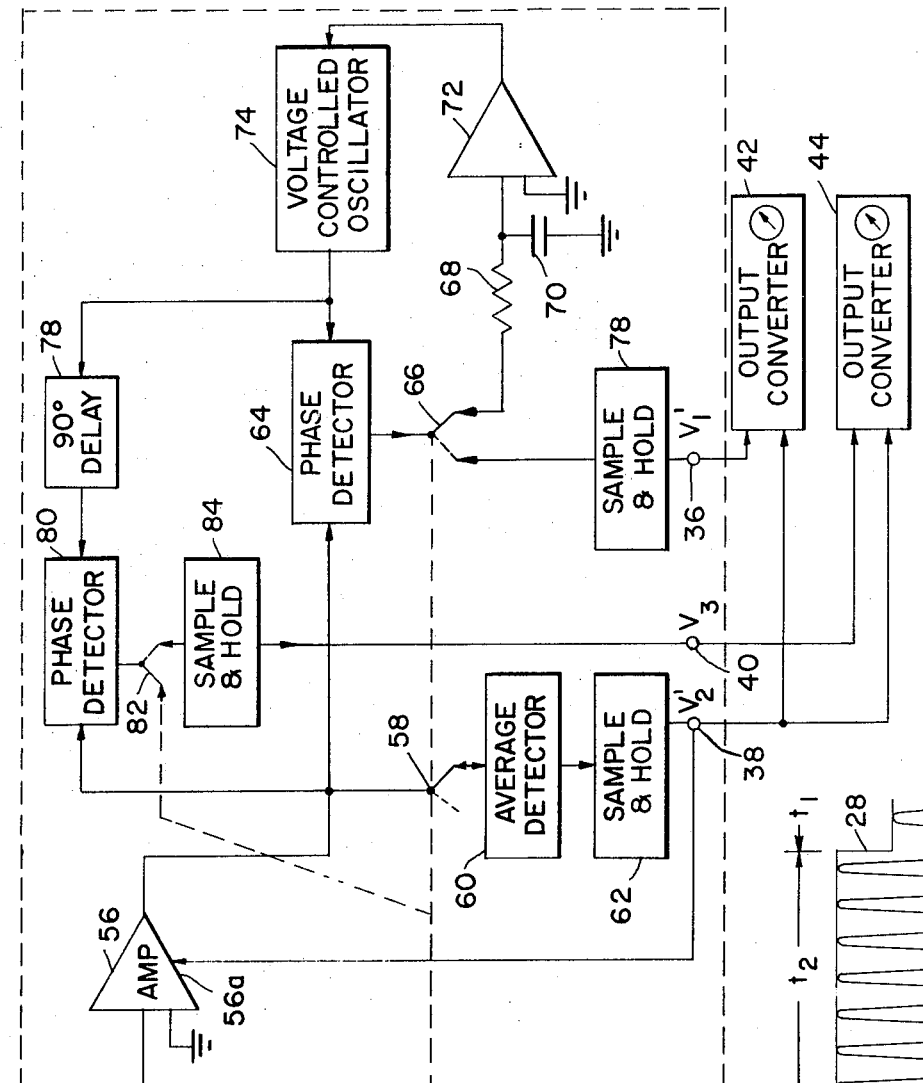
FIG. 1 is a schematic representation, partly in block form, of a capacitance-measuring instrument embodying the invention.

FIG. 1 shows a capacitance-measuring instrument having a modulator section indicated generally at 10 in which a radio frequency source 12 applies current, schematically by way of switches 14 and 18, to a terminal 16 alternately through the "unknown" admittance of a circuit element 20 being measured, and through the known admittance of a reference circuit element 24. A switch controller 26 operates the switches 14 and 18 asynchronously, opening one when it closes the other, at periodic intervals many times longer than the period of the source 12. Accordingly, the current leaving the demodulator 10 at the terminal 16 has a waveform of the type shown in FIG. 2. Curve 28 forming the top half of the waveform envelope corresponds to the switching operation of switches 14 and 18.

Thus, during the time interval $t_1$, switch 14 is closed and switch 18 is open, and the modulator output current is the the current $i_1$, shown with waveform 30, through the circuit element 20. In the other time interval $t_2$ when switch 14 is open and switch 18 is closed, the condition shown in FIG. 1, the modulator output current is the current $i_2$ through the reference circuit element 24. This current has the waveform 32, FIG. 2. The two current waveforms 30 and 32 have the same frequency, identical to the frequency of the source 12, but have different magnitudes and have different relative phases, as indicated by the discontinuities between the two curves 30 and 32 at their junctures.

With further reference to FIG. 1, the measuring circuit has a demodulator or detection portion 34 that receives the modulated current from the modulator terminal 16, and performs two demodulations in an alternate sequence synchronized with the operation of the switch controller 26 to produce at a terminal 36 a voltage $v_1$ proportional to the susceptance of the circuit element 20 and at a terminal 38 a voltage $v_2$ proportional to the conductance of the reference element 24. The illustrated demodulator further produces, at terminal 40, a voltage $v_3$ proportional to the conductance of the unknown element 20. An output converter 42 receives the voltages $v_1$ and $v_2$ and in response produces an output indication identifying the capacitance of the circuit element 20 relative to the reference element 24. A further converter 44 indicates the value of the conductance of the unknown element 20, also relative to the reference element 24.

The details of the illustrated demodulator are discussed below after further consideration of the modulator 10.

The source 12, operating at the frequency at which the circuit element 20 is to be measured, is connected between the moving contacts of the switches 14 and 18, which together operate as a double-pole, double-throw switch. The switch fixed contacts are connected to the unknown circuit element 20, known element 24, and ground or other return conductor as shown. With this arrangement, when switches 14 and 18 are reversed from the position shown the source voltage is applied effectively as voltage $e_1$ across the circuit element 20 being measured, and the modulator produces the "unknown" current $i_1$. With the switches in their other positions as shown, the source voltage is applied with opposite phase, as voltage $-e_1$, to the reference circuit element 24 and the modulator produces the "reference" current $i_2$.

The switch controller 26 operates the switches cyclically, opening switch 14 and closing switch 18 for a half-cycle time $t_2$ and reversing the switches during the other half-cycle time $t_1$. FIG. 1 shows the measuring circuit with these switches and others discussed below in the positions they have during each $t_2$ interval.

The reference circuit element 24 of the illustrated modulator is a resistor of known value, expressed as a conductance $G_R$. The reference element preferably has minimal reactance, i.e., it is purely resistive. The unknown circuit element 20 is illustrated as a capacitor 20a having a value $C_X$ and shunted by a resistor 20b of value $G_X$. The circuit element 20 is connected to the modulator at terminals 46, 46.

Figure 3:
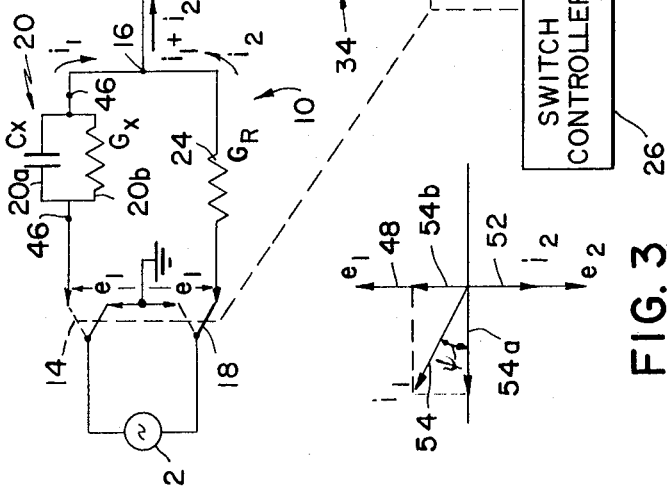
FIG. 3 is a vector diagram pertinent to the operation of the measuring circuit of FIG. 1.

With this illustrated modulator construction, the voltages $e_1$ and $-e_1$ can be represented by vectors 48 and 50 respectively, as shown in FIG. 3. Further, vector 52 represents the reference current $i_2$ and is in phase with the voltage vector 50 because the reference element is purely resistive. (The demodulator input amplifier 56 is assumed to have an input impedance that is purely resistive and which preferably is small relative to the impedance being measured.) The length of vector 52 is proportional to the conductance value $G_R$ of the element 24.

FIG. 3 also shows a vector 54 representing the unknown current $i_1$. This vector leads the voltage vector 48 by 90° less the angle $\psi$ due to the resistor 20b. That is, the vector 54 is the resultant of a vector component 54a that represents the current in the unknown capacitor 20a and of a vector component 54b that represents the current in the unknown resistor 20b. The length of vector component 54a is proportional to the capacitance $C_X$ and the length of the component 54b is proportional to the conductance $G_X$.

Figure 2:
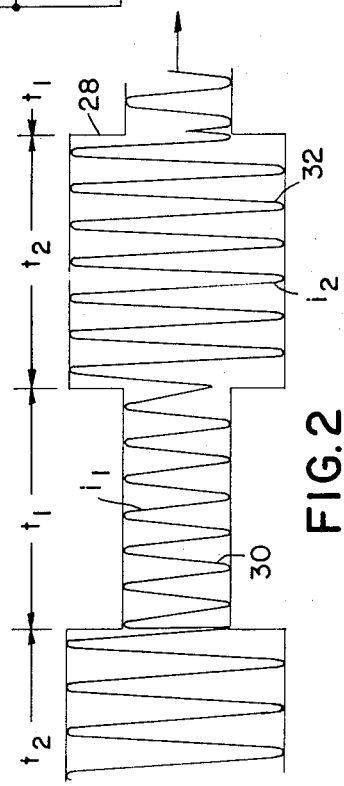
FIG. 2 is a plot of current as a function of time illustrating the operation of the modulator portion of the FIG. 1 instrument.

The current output from the demodulator is the vector 54 current $i_1$ during each time interval $t_1$ and is the vector 52 current $i_2$ during each time interval $t_2$, as shown in FIG. 2. The FIG. 3 vector representation of these two currents shows that they contain all of the information needed to identify the capacitance $C_X$ and the conductance $G_X$ of the circuit element 20 relative to the known admittance, i.e., conductance $G_R$, of the reference element 24.

The demodulator 34 extracts this information from the current it receives from the modulator 10 and displays the resultant values with suitable indicators on the converters 42 and 44.

With further reference to FIGS. 1, 2 and 3, the demodulator 34 amplifies the current from the modulator terminal 16 with an amplifier 56 having an automatic gain control (AGC) input terminal 56a. During the time periods when demodulator switch 18 is closed, a switch 58, illustrated as a single-pole, single-throw switch and operated by the switch controller 26 in synchronism with switches 18 and 14, applies the amplifier output signal to an average detector 60. The detector, which thus receives only the portion of the amplifier output signal that corresponds to the reference current $i_2$, applies a resultant detected direct voltage to a sample and hold unit 62. The signal output from the unit 62 is the voltage $v_2$ noted above; it is proportional to the magnitude of the FIG. 3 vector 52, i.e., to the known conductance $G_R$ of the circuit element 24. This voltage is applied from the output terminal 38 to the amplifier 56 AGC input terminal 56a, in addition to being applied to each output converter 42 and 44.

The reason the voltage $v_2$ is applied to the amplifier 56 AGC input terminal is to maintain the gain of the amplifier during each $t_1$ interval the same as it was in the preceding $t_2$ interval, i.e., so that the amplifier has the same gain for the unknown current $i_1$ as it has for the reference current $i_2$.

The amplifier 56 output signal also is applied to one input of a phase detector 64. During the time intervals $t_2$, a switch 66, schematically a single-pole, double-throw switch operated with the switches 14, 18 and 58, applies the phase detector 64 output signal to a sample and hold network formed by a series resistor 66 and a shunt capacitor 70. An operational amplifier 72 receives the voltage across the capacitor 70 and drives a voltage-controlled oscillator 74 in response to it. The alternating signal output from the oscillator is applied to the other input of phase detector 64.

This arrangement of the elements 64, 66, 68, 70, 72 and 74 forms a synchronous detector of the so-called phase-lock type and accordingly the amplifier 72 drives the oscillator 74 to produce a radio frequency signal identical in frequency to, and shifted 90° in phase from, the signal the phase detector receives from the amplifier 56. This is because with these like-frequency and quadrature-phased signals input to the phase detector 64, its output signal has null value and hence the amplifier 72 receives a null input signal. Accordingly, during the time intervals $t_2$ when the demodulator 34 receives the reference current $i_2$, the elements 64–74 operate to develop the quadrature reference signal output from the oscillator 74. The sample and hold circuit provided by resistor 68 and capacitor 70 maintains the oscillator 74 in this operation during the alternate time intervals $t_1$ when the switch 66 is removed from the position shown.

During the time intervals $t_1$, when switch 14 is closed, switches 18 and 58 are open, and switch 66 is in the position shown with dashed lines, the phase detector 64 continues to receive the quadrature reference signal from the voltage-controlled oscillator 74, but now receives from the amplifier 56 a signal corresponding to the unknown current $i_1$. In response to these signals, which have the relative phases of the vector 54 and vector 48, the phase detector produces a direct voltage that is proportional essentially only to the magnitude of the FIG. 3 vector component 54a, and hence to the value of the unknown capacitance $C_X$. The switch 66 applies this direct voltage to a sample and hold network 76, the output of which is the terminal 36 at which the demodulator develops the voltage $v_1$ corresponding to the susceptance of the circuit element 20 and hence to the value $C_X$ of capacitor 20a.

To detect the component of the $i_1$ current responsive to the conductance component of the circuit element 20, the demodulator 34 has a 90° phase shifter 78 that shifts by 90° the phase of the quadrature reference signal from the oscillator 74 and applies it to one input of a further phase detector 80. The other input to the phase detector 80 is the signal output from amplifier 56. A switch 82, operated in synchronism with the switch 14 so as to be closed only during the $t_1$ intervals, applies the phase detector 80 output voltage to a sample and hold network 84, the output voltage from which is the $v_3$ voltage proportional to the conductance $G_X$ of the circuit element 20, i.e., to vector component 54b.

With further reference to FIG. 1, the demodulator 34 is constructed with the signal path from the amplifier 56 to the phase detector 80 having the same electrical length and hence the same phase delay as the signal path from the amplifier 56 to the phase detector 64. Further, the two phase detectors have identical internal delays to the r. f. signals they receive. Also, the signal path from oscillator 74 to detector 80, including delay unit 78, is longer by a quarter wavelength, i.e., 90°, than the path from the oscillator to detector 64. These are the only requirements on the demodulator for accurate measuring operation. This is because the demodulator 34 processes both the reference current $i_2$ and the unknown current $i_1$ with the amplifier 56, and applies both currents to the phase detectors 64 and 80. Thus both modulated currents propagate in the demodulator on the same signal paths. Hence, with the foregoing construction of the r. f. paths in the demodulator, stray reactances in the r. f. portion of the demodulator, i.e., between the amplifier 56 input and into the two phase detectors and from the oscillator 74 to the two detectors, will effect both currents identically and have no net effect on the accuracy of the demodulator operation.

In the modulator 10, however, certain stray reactances will effect the two currents $i_1$ and $i_2$ differently, and the modulator accordingly is constructed with known techniques to minimize them. Specifically, the modulator 10 develops the voltages $e_1$ and $-e_1$ with equal magnitudes and opposite relative phases, as indicated by the opposed FIG. 3 vectors 48 and 50. Stray reactances, i.e., reactances other than of the circuit element 20 being measured, in the path of current $i_1$ from the fixed contact of switch 14 to terminal 16 will offset the relative phase and/or magnitude of this current. Hence this path is constructed with essentially reactance-free components, particularly with components free of series inductance. Shunt capacitances, i.e., to ground, in this path are of lesser significance unless the input impedance of the demodulator amplifier 56 is not made small relative to the impedance of the unknown element 20 and of the reference element 24; hence a low amplifier input impedance is provided. Further, modulator capacitances in shunt with the current $i_1$ can be cancelled by a neutralizing capacitor equal to these shunt capacitances and driven in phase opposition to $e_1$, e.g., with the voltage $-e_1$.

Similarly, the modulator 10 develops the current $i_2$ in a path essentially free of stray reactances.

Thus, the modulator 10 is constructed with such essentially reactance-free components and interconnections that the phase and magnitude of the unknown current $i_1$ reflect only the real and imaginary components of the element 20 impedance being measured, and the reference current $i_2$ has a known phase relative to the source voltages $e_1$ and $-e_1$ and has a magnitude dependent only on the known conductance $G_R$.

Figures 4, 5:
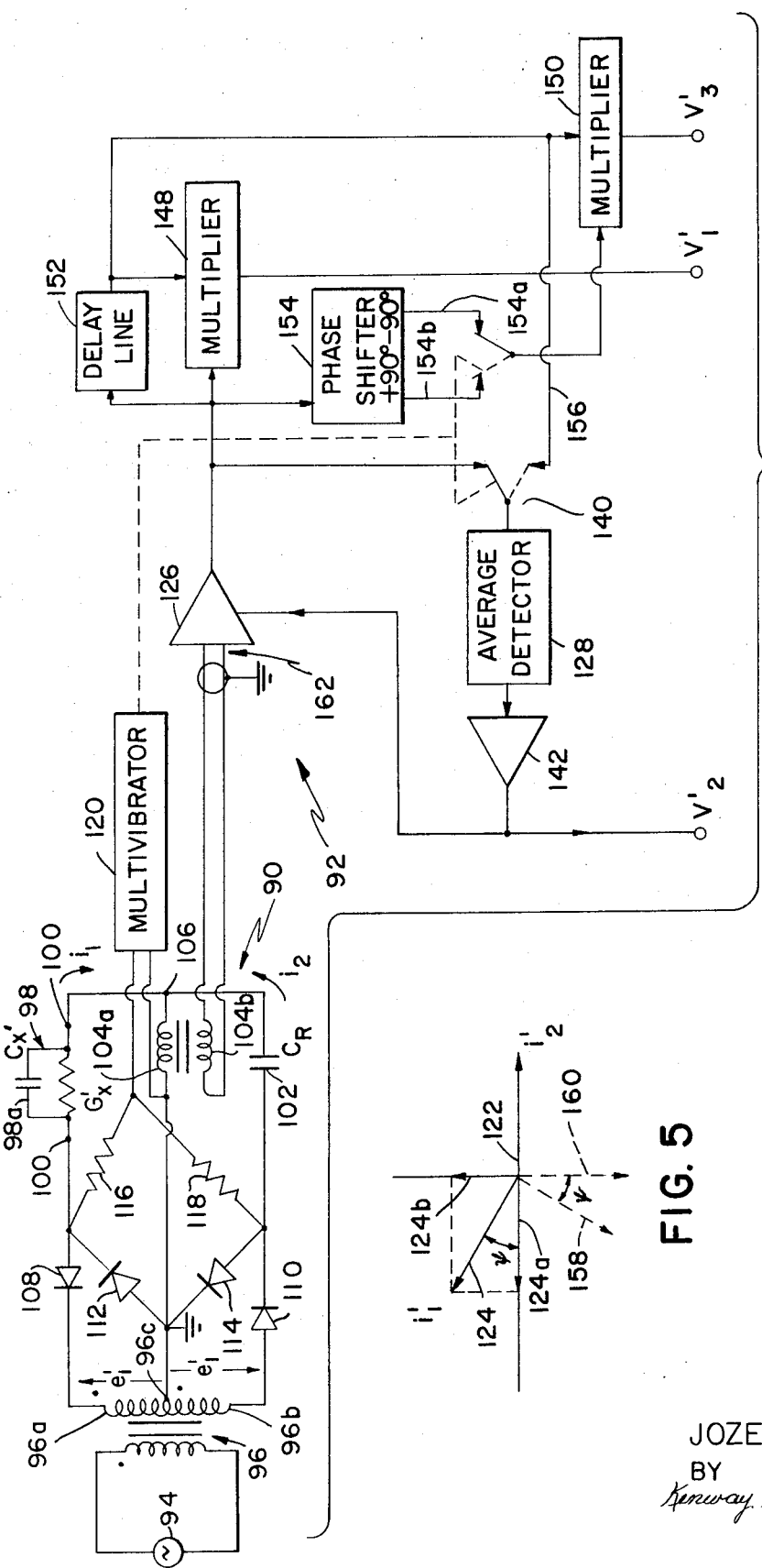
FIG. 4 is a schematic representation, partly in block form, of another capacitance-measuring instrument embodying the invention.
FIG. 5 is a vector diagram pertinent to the operation of the measuring circuit of FIG. 4.

FIG. 4 shows another impedance-measuring circuit embodying the invention and generally similar to the circuit of FIG. 1 except that the former has a delay line and a multiplier-type demodulator, rather than the phase lock-type demodulator 34 of FIG. 1. More particularly, the FIG. 4 measuring circuit has a modulator portion 90 that produces current with a waveform similar to that shown in FIG. 2, and has a demodulator portion 92 that extracts the desired impedance-measuring signals from this current.

The modulator 90 is basically identical to the modulator 10 of FIG. 1 except that it employs a capacitive reference circuit element. It also illustrates one construction for the FIG. 1 switches 14 and 18 and switch controller 26, and it employs transformer coupling between the modulator and the demodulator. In particular, the modulator 90 has a radio frequency oscillator or other source 94 exciting the primary winding of a transformer 96 that has two secondary windings 96a and 96b connected in series at a grounded tap 96c. The secondary windings can have different numbers of turns but for simplicity are illustrated as having a unity turns ratio. Further, the two secondary windings are arranged as indicated with the conventional dot notation, which means that when the upper end of the transformer primary winding is positive, the uppermost end of secondary winding 96a is positive and the bottommost end of winding 96b is negative. Consequently the voltages developed across the two secondary windings are out of phase as designated on the drawing with the voltages $e_1'$ and $-e_1'$.

A circuit element 98 to be measured, and illustrated as including a capacitor 98a of capacitance $C_X'$ and shunted by a resistor 98b of conductance $G_X'$, is connected between terminals 100, 100 in one loop of the modulator 90 to modulate a current $i_1'$ in response to the voltage $e_1'$ developed across the transformer secondary winding 96a. Similarly, a reference circuit element 102 in the form of a capacitor with known capacitance $C_R$ is connected in the other loop of the modulator 90 to draw a current $i_2'$ in response to the r. f. voltage $-e_1'$ developed across the transformer winding 96b. The primary winding 104a of a coupling transformer 104 is connected between a terminal 106 interconnecting the two modulator loops and the interconnection 96c of the two secondary windings 96a and 96b. The output signal from the modulator 90 is taken from the coupling transformer secondary winding 104b.

With this arrangement, the coupling transformer primary winding 104a receives one of the currents $i_1'$ or $i_2'$ depending on which loop of the modulator is switched in circuit with the transformer 96 to receive current from it. To effect this switching, the modulator 90 has a diode 108 in series between the circuit element 98 and the winding 96a and poled to conduct forward current from the circuit element to the winding; and has a like diode 110 in series between, and poled to conduct current from, the winding 96b and the reference circuit element 102. Further, a diode 112 is connected to conduct forward current from the transformer tap 96c to the anode of diode 108, and a further diode 114 is connected to conduct forward current from the cathode of diode 110 to the tap 96c. Current limiting resistors 116 and 118 connect one side of a multivibrator 120 respectively to the anode of diode 118 and the cathode of diode 110; the other side of the multivibrator is connected to the ground return conductor.

When the multivibrator output voltage, which is a periodic square wave that switches symmetrically about ground from a positive voltage to a negative voltage, applies a positive voltage to resistors 116 and 118, diodes 108 and 114 are forward biased, and diodes 112 and 110 are reversed biased. The reversed-biased diode 110 blocks the source voltage across winding 96b from the reference circuit element 102 and instead the forward-biased diode 114 couples on side of this element to ground to constrain the $i_2'$ current to zero at this time. However, the forward-biased diode 108 connects the unknown circuit element 98 and transformer winding 104a in series with the winding 96a and the modulator develops the current $i_1'$. When the multivibrator 120 switches so that it applies a negative potential to resistors 116 and 118, the conditions of the switching diodes are reversed, with the result that the coupling transformer winding 104a and the reference circuit element 102 are in series with the secondary winding 86b and the modulator 90 applies the current $i_2'$ to the winding 104a; diode 112 now constrains the current $i_1'$ to zero. Thus, in successive time intervals determined by the switching of the multivibrator 120, the modulator 90 develops a current in the coupling transformer 104b that is alternately responsive to the current $i_1'$ and to the current $i_2'$. This operation of the FIG. 4 modulator 90 is thus identical to the operation of the FIG. 1 modulator 10.

FIG. 5 shows in vector form the relative phases of the currents $i_1'$ and $i_2'$. Vector 122 represents the current $i_2'$ dependent on the reference circuit element 102 and vector 124 represents the current $i_1'$. Due to the out-of-phase arrangement of the secondary windings 96a and 96b, the two vectors would be 180° out of phase if the unknown circuit element 98 were a pure capacitance. However, the presence of conductance $G_X'$ reduces the angle between the two vectors by the angle $\psi'$ as indicated. Consequently, the vector 124 component 124a, which is 180° out of phase with the vector 122, is a measure of the capacitance $C_X'$ of the circuit element 98 and the quadrature component 124b is a measure of the conductance $G_X'$ of this circuit element.

As in the FIG. 1 demodulator 34, the demodulator 92 amplifies the modulated output current with an amplifier 126 receiving an automatic gain control (AGC) voltage responsive only to the reference current $i_2'$. FIG. 4 illustrates that this AGC voltage is developed with an average detector 128 and a d. c. amplifier 142. A switch 140, illustrated schematically as a single-pole, double-throw switch alternately applies to the input of detector 128 the output signal from amplifier 126 and the signal output from a delay line 152. The switch 140 is operated in synchronism with multivibrator 120 so that both signals it applies to the detector 128 are responsive to the reference current $i_2'$ input to amplifier 126. More specifically, the switch 140, typically constructed of semiconductor elements as are the modulator switches and controlled by the modulator multivibrator 120, switches from the position shown to the other position indicated with a dashed line during each time interval when the modulator 90 produces the unknown current $i_1'$.

The output voltage from the amplifier 142 is the automatic gain control voltage for the amplifier 126. It also is the demodulator output voltage $v_2'$ that represents the value of the reference capacitance $C_R'$.

The remainder of the demodulator 92 is a synchronous detector constructed with a pair of linear four-quadrant multipliers 148 and 150, a delay line 152, and a 90° phase shifter 154 having two out-of-phase output terminals which a switch 156 selectively connects one at a time to the multiplier 150 in synchronism with the operation of multivibrator 120 and hence with switch 140. The delay line 152 has a delay equal to one-half the period of the multivibrator 120 operation. Thus, the delay is equal to the length of each time interval $t_1$ and $t_2$ indicated in FIG. 2 or, in other words, is equal to the interval during which the modulator produces either current $i_1'$ or $i_2'$.

When the demodulator switches 140 and 156 are in the positions shown, corresponding to the time intervals when the modulator produces the reference current $i_2'$, the multiplier 148 receives from the amplifier 126 a signal responsive to the reference current $i_2'$ and hence to the FIG. 5 vector 122. From the delay line 152, the multiplier 148 receives a signal that is responsive to the output from amplifier 126 during the previous half cycle of multivibrator 120 operation; this signal is the amplifier 126 output signal responsive to the unknown current $i_1'$ and which corresponds to the FIG. 5 vector 124.

In response to these input signals, the multiplier 148 produces an output voltage corresponding to the projection of vector 124 on the axis of vector 122. Hence the multiplier produces an output voltage representing the vector component 124a, which is the measure of the capacitance $C_X'$ of the unknown circuit element 98.

When the multivibrator output voltage switches, the input signals to the multiplier 148 are identical but reversed, i.e., from the amplifier 126 the multiplier receives a signal responsive to the unknown current $i_1'$ and from the delay line 152 it receives a signal responsive to the reference current $i_2'$ produced during the immediately preceding half-cycle of the multivibrator 120 operation. Accordingly, the multiplier output voltage is the same, i.e., is responsive to the vector component 124a. Thus, the output voltage $v_1'$ from the multiplier 148 is a constant representation or measure of the capacitance $C_X'$ of the unknown circuit element 98.

The other multiplier 150 of the demodulator 92 operates in a similar manner but receives the amplifier 126 output signal with a 90° phase shift and hence produces an output voltage, $v_3'$, that is a constant measure of the conductance $G_X$ of the circuit element 98. That is, when the multivibrator 120 operates the modulator 90 to produce the reference current $i_2'$, during which time the demodulator switches 140 and 156 are in the positions shown, the multiplier 150 receives, by way of the phase shifter output terminal 154a and switch 156, the amplifier 126 output signal shifted in phase by −90°, and it receives by way of delay line 152 the amplifier output signal at the immediately preceding time interval. The former signal represents the reference current $i_2'$ vector 122 delayed in phase by 90° and hence represents the FIG. 5 vector 160. The latter signal represents the unknown current $i_2'$ vector 124. In response to these signals, the multiplier 150 produces the $v_3'$ output voltage according to the projection of bector 124 aligned with vector 160, and this projection is identical to the vector component 124b. Accordingly, the multiplier 150 output voltage during this time interval is a measure of the conductance $G_X$ of the unknown circuit element 98.

When the multivibrator 120 switches so that the modulator 90 produces the unknown current $i_1'$, and the switches 140 and 156 are switched from the solid-line positions shown in FIG. 4, multiplier 150 receives via delay line 152 the amplifier 126 output signal responsive to vector 122. From the phase shifter 154 terminal 154b, and by way of switch 156, the multiplier in addition receives the amplifier 126 output signal responsive to the unknown current vector 124 advanced in phase by 90° and, accordingly, corresponding to the FIG. 5 vector 158. In response to these two signals, the multiplier 150 produces an output voltage responsive to the projection of vector 158 on the axis of vector 122 and this is again the vector component 124b that is a measure of the unknown circuit element conductance $G_X'$. Thus, the multiplier 150 output voltage $v_3'$ is a measure of the conductance $G_X'$.

The FIG. 4 demodulator 92 thus produces three d.c. output voltages that are essentially identical to the three output voltages from the FIG. 1 demodulator and that can be applied to suitable output converters or other devices to provide the desired absolute measures of the capacitance and conductance of the circuit element 98, references to the capacitance of the reference element 102.

Further, as with the FIG. 1 measuring circuit, the FIG. 4 circuit only requires that the modulator 90 be constructed to minimize the stray series impedances and the stray shunt impedances in the manner discussed above with reference to FIG. 1. The demodulator 92 can be constructed without these restrictions. It only requires that the signal path directly from amplifier 126 to multiplier 148 differ in electrical length from the path from the amplifier to the multiplier by way of the delay line only by the aforementioned delay of the delay line. Also, the electrical length of the two signal paths from the amplifier 126 to multiplier 150, one by way of delay line 152 and the other by way of the phase shifter 154, have the same electrical lengths, exclusive of the prescribed operation of units 152 and 154, as the signal path from the amplifier to the multiplier 148.

Accordingly, the demodulator 92 can be remote from the modulator 90 and connected to it by a long length of cable 162 between the transformer secondary winding 104b and the amplifier 126. Alternatively, a wireless communication link can couple the demodulator 92 to the modulator 90 in place of the cable 162. In either case, in the same manner as illustrated in FIG. 1, this FIG. 4 transmission path between modulator 90 and demodulator 92 requires only a single information channel to convey the ($i_1'$ and $i_2'$)-dependent current from transformer 104 to amplifier 126.

The multipliers 148 and 150 in the FIG. 4 demodulator can, by way of example, be integrated circuit multipliers. Further, the overall construction of this demodulator and of the FIG. 1 demodulator are similar to those used in color television receivers.

It should be noted that the demodulator of each measuring circuit, i.e., in FIG. 1 and in FIG. 4, provides an information storage function, among other functions. In the FIG. 1 demodulator 34, the sample and hold network of resistor 68 and capacitor 70, with amplifier 72 and the oscillator 74, store information regarding the phase and the frequency of the reference current. In the demodulator 92 of FIG. 4, on the other hand, the delay line 152 stores information regarding the reference current phase, frequency and amplitude.

The measuring circuits of both FIG. 1 and of FIG. 4 can be used for measuring inductive unknown circuit elements equally as well as for the capacitance measurements described. Where the FIG. 4 circuit element 98 being measured has an inductive impedance, rather than the capacitive impedance illustrated, the circuit can use the same capacitive reference element 102. However, the polarity of the output voltage $v_1'$, which is responsive to the imaginary component of the impedance of the circuit element 98, will reverse from the polarity it had for the capacitive circuit element 98. That is, the polarity of the FIG. 4 voltage $v_1'$ will change depending on whether the circuit element 98 is inductive or capacitive. Also, the FIG. 4 circuit can use an inductive reference element in place of the capacitive element 102.

The FIG. 1 measuring circuit also can use the same resistive reference element 24 for measuring both inductive and capacitive circuit elements, and the polarity of the $v_1$ output voltage will change accordingly.

The phase-lock demodulator of FIG. 1 is considered to be more suitable for use with a modulator having a purely resistive reference element, as illustrated. Likewise the delay line demodulator of FIG. 4 is considered to be inherently advantageous for use with a modulator having a purely reactive reference element, again as illustrated.

However, the FIG. 1 measuring circuit can use an inductive or a capacitive reference element, and the FIG. 4 circuit can use a resistive reference element; but in either instance the change will require a change in the corresponding demodulator to account for the different relative phase of the resultant signal.

Also, the invention can be practiced with the dual of the illustrated modulators 10 and 90. That is, the illustrated modulators apply an r.f. source voltage to the unknown and reference circuit elements, and process the resultant currents. A modulator constructed as the electrical dual applies the current from an r.f. source to the two circuit elements on a time-sequential basis, and processes the resultant voltages.

However, whatever form of the measuring circuits one employs will provide reactance measurement with a minimum of error due to stray reactances. And the modulator portion of the measuring circuit can be constructed with such small size that it can be placed closely adjacent to a miniature circuit element being measured, as is desired for the accurate measuring of integrated circuits.

It will thus be seen that the objects set forth above, among those made apparent from the preceding description, are efficiently attained. Since certain changes may be made in the above constructions without departing from the scope of the invention, all matter contained in the above description or shown in the accompanying drawings shall be interpreted as illustrative and not in a limiting sense.

It is also to be understood that the following claims are intended to cover all of the generic and specific features of the invention ascribed herein, and all statements of the scope of the invention which, as a matter of language, might be said to fall therebetween.

Having described the invention, what is claimed as new and secured by Letters Patent is:

1. Electrical apparatus for producing a measurement of the reactive electrical impedance of a first circuit element, said apparatus comprising
   A. a pair of terminals for connection to said first circuit element,
   B. a second circuit element of known electrical impedance,
   C. current source and switching means connected with said pair of terminals and with said second circuit element, and producing a single alternating current with both a phase and a magnitude dependent in alternate time periods first on the reactive impedance between said pair of terminals and second on said known impedance of said second element, said current source and switching means producing said current with relative phases, in said first and second alternate time periods, dependent substantially only on the reactance of said first circuit element, and on the reactance of said second circuit element, respectively,
   D. signal transmission means providing a single information channel and coupled in circuit with said current source and switching means, and transmitting a signal corresponding to said single alternately-dependent current to signal-processing means separated therefrom, and
   E. detecting means receiving said signal corresponding to said alternately-dependent current and receiving a control signal identifying the switching of said current source and switching means between said alternate time periods, and producing in response thereto an output measurement of said reactive impedance between said pair of terminals relative to said known impedance.

2. Electrical apparatus as defined in claim 1 in which
   A. said reference circuit element has an impedance of known reactance, and
   B. said detecting means detects the phase of said alternately-dependent current which is dependent on said impedance between said pair of terminals terminals relative to the phase of said current which is dependent upon said known impedance to produce said output measurement.

3. Electrical apparatus as defined in claim 1 in which said current source and switching means comprises
   A. a source of alternating current,
   B. output terminal means at which said alternately-dependent current is developed, and
   C. double-pole, double-throw switch means alternately, in successive time periods, connecting said source current with a first relative phase of said current in circuit with said pair of terminals and said output terminal means and, connecting said source current with a reversal of said relative phase of said current in circuit with said second circuit element and said output terminal means.

4. Electrical apparatus as defined in claim 3 in which said current source and switching means further comprises circuit means of low reactance interconnecting said switch means and output terminal means with said pair of terminals and with said second circuit element, and develops said current at said output terminal means with phases, relative to the phase of said source, dependent substantially exclusively on the reactance of said first circuit element and of said second circuit element, respectively, in each of said alternate time periods.

5. A reactance-measuring circuit comprising
   A. means for modulating at least the phase of a radio frequency signal in a succession of time intervals alternately by essentially only the reactance of a first circuit element being measured and by essentially only the reactance of a second reference circuit element,
   B. single-channel signal transmission means for delivering said modulated radio frequency signal away from said modulating means, and
   C. means for receiving said modulated radio frequency signal from said transmission means and for detecting at least the phase of the modulation of said signal by said reactance of said first circuit element relative to the phase of the modulation of said signal by said known reactance of said reference circuit element and in time synchronism with the alternation of said time intervals, and for providing an output signal responsive to the result of said detection, thereby to provide a measure of the reactance of said first circuit element.

6. A measuring circuit as defined in claim 5 in which said transmission means consists of a single conductive path interconnecting said modulating means and said receiving and detecting means and conducting said modulated signal therebetween.

7. A circuit for measuring the impedance of a first circuit element comprising
   A. a radio frequency source of alternating voltage at the frequency of measurement,
   B. a pair of first terminals for connection to said first circuit element,
   C. a second circuit element of known impedance,
   D. switch means having first and second switch conditions and, when in said first condition connecting said source voltage to said first terminals to develop therebetween a first current dependent in phase and magnitude on the impedance of said first circuit element connected therebetween, and when in said second condition connecting said source voltage to said second circuit element to develop therein a second current dependent in phase and magnitude on said known impedance,
   E. switch control means for changing said switch means successively between said first and second conditions,
   F. current summing means connected with said first terminals and with said second circuit element and developing a further current responsive in successive time intervals to said first current and to said second current,
   G. signal transmission means connected with said summing means and providing a single information channel for transmitting said further current to a location removed from said pair of first terminals, and
   H. synchronous detector means located removed from said pair of first terminals and receiving from said transmission means a signal corresponding to said further current from said summing means and receiving a control signal corresponding to the condition-changing operation of said switch control means for producing a first output signal responsive to the magnitude of a first component of said first current having a selected phase relative to said second current.

8. A measuring circuit as defined in claim 7 in which said synchronous detector means further produces a second output signal responsive to the magnitude of a second component of said first current 90° out of phase with said first component thereof.

9. A measuring circuit as defined in claim 7 further characterized in that said switch means, said current summing means, and circuit means interconnecting said switch means and said summing means with said first terminals and with said second element are substantially free of reactance so that said first and second currents differ from each other in phase and magnitude essentially only by the difference between the impedance of said first circuit element between said first terminals and said known impedance of said second circuit element.

10. A measuring circuit as defined in claim 7 in which said synchronous detector means comprises
   A. a first detector for producing a reference direct voltage responsive to a signal corresponding to said second current from said current means,
   B. a phase detector receiving a first input signal corresponding to said sum of said first and second current from said current summing means,
   C. a reference signal source for receiving the output signal from said phase detector and producing a second input signal to said phase detector with a frequency and phase that null the phase detector output signal, and
   D. switch means connected for operation in timed sequence with said switch control means for applying to said first detector only the portion of said first input signal corresponding to said second current from said current summing means, and for applying the phase detector output signal to said reference signal source only during delivery to said phase detector of said portion of said first input signal corresponding to said second current from said current summing means.

11. A measuring circuit as defined in claim 10 further comprising output converter means for receiving said reference direct voltage and for receiving said phase detector output signal responsive to the portion of said first input signal corresponding to said first current from said current summing means, and producing in response thereto a measure of the reactance of said first circuit element relative to said known impedance.

12. A measuring circuit as defined in claim 7 in which said synchronous detector means comprises A. a multiplier receiving a first input signal corresponding to said sum of said first and second currents from said current summing means, B. delay means for receiving said first input signal to said multiplier and applying it to a second input of said multiplier with a time delay equal to the time interval during which said switch control means maintains said switch means in each of said first and second conditions, and C. a first detector receiving only the portion of said first input signal corresponding to said second current output from said summing means and producing a reference direct voltage in response thereto.

13. A measuring circuit as defined in claim 12 further comprising output converter means receiving said reference direct voltage and the output from said multiplier, and producing in response thereto a signal measuring the reactance of said first circuit element relative to said known impedance.

* * * * *